United States Patent [19]
Forte

[11] Patent Number: 5,941,283
[45] Date of Patent: Aug. 24, 1999

[54] PRESSURE PULSE ATTENUATING FLUID SUPPLY CONDUIT

[75] Inventor: Guido Forte, San Gillio, Italy

[73] Assignee: Dayco Europe S.p.A, Colonnella, Italy

[21] Appl. No.: 08/860,348

[22] PCT Filed: Dec. 6, 1995

[86] PCT No.: PCT/IT95/00210

§ 371 Date: Oct. 22, 1997

§ 102(e) Date: Oct. 22, 1997

[87] PCT Pub. No.: WO96/18065

PCT Pub. Date: Jun. 13, 1996

[30] Foreign Application Priority Data

Dec. 7, 1994 [IT] Italy ................................. T094A1004

[51] Int. Cl.⁶ ................................................ F16L 55/04
[52] U.S. Cl. .......................... 138/26; 138/30; 138/109; 138/113; 181/255
[58] Field of Search ................... 138/30, 26, 114, 138/113, 112, 109; 181/255, 207, 196, 234, 233, 227, 228, 223; 417/540

[56] References Cited

U.S. PATENT DOCUMENTS

| 3,147,097 | 9/1964 | Aguas | 181/227 X |
|---|---|---|---|
| 4,611,633 | 9/1986 | Buchholz et al. | 138/26 |
| 4,705,138 | 11/1987 | Reese | 181/228 X |
| 5,094,271 | 3/1992 | Fritz et al. | 138/26 X |
| 5,172,729 | 12/1992 | Vantellini | 181/255 X |
| 5,201,343 | 4/1993 | Zimmermann et al. | 138/26 |
| 5,449,866 | 9/1995 | Moss | 181/228 |
| 5,495,711 | 3/1996 | Kalkman et al. | 138/26 X |

FOREIGN PATENT DOCUMENTS

| 2543342 | 9/1984 | France . |
|---|---|---|
| 2566504 | 12/1985 | France . |
| 1079389 | 8/1967 | United Kingdom . |
| 9113790 | 9/1991 | WIPO . |

*Primary Examiner*—Patrick Brinson
*Attorney, Agent, or Firm*—Robert W. Becker & Associates

[57] ABSTRACT

A fluid supply conduit for attenuating pressure pulses in a fluid. At least one inner tube is disposed in an outer tube and forms an annular chamber therewith. The inner tube is connected to a fitting that is fitted in a sealed manner to the outer tube. The closing element closes off an end of the inner tube, which has at least one intermediate hole at predetermined distances from respective reflecting surfaces defined by the fitting and by the closing element.

14 Claims, 2 Drawing Sheets

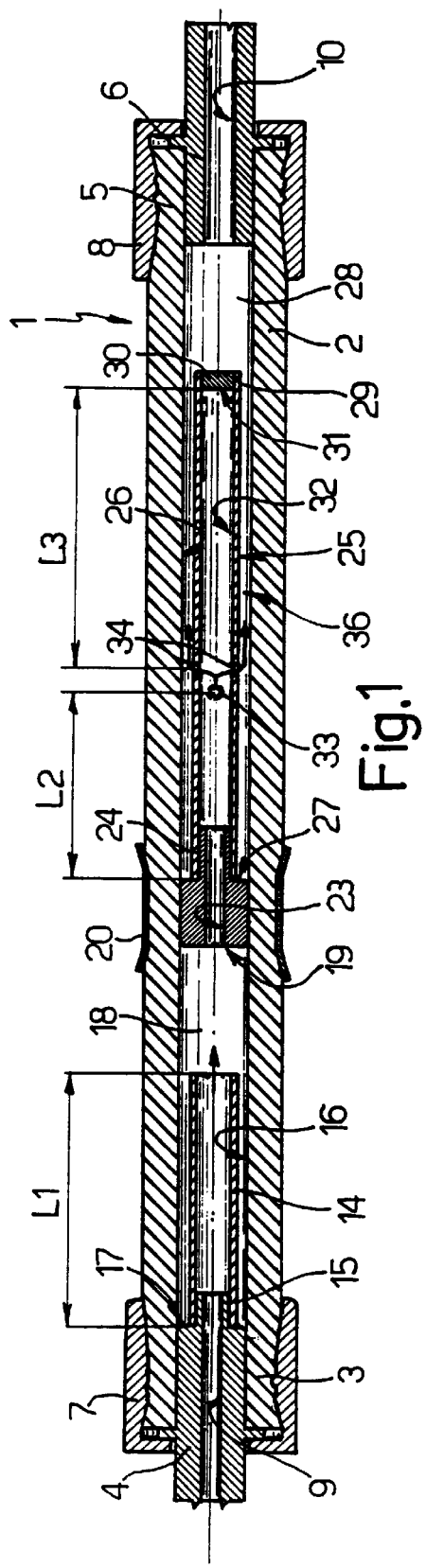
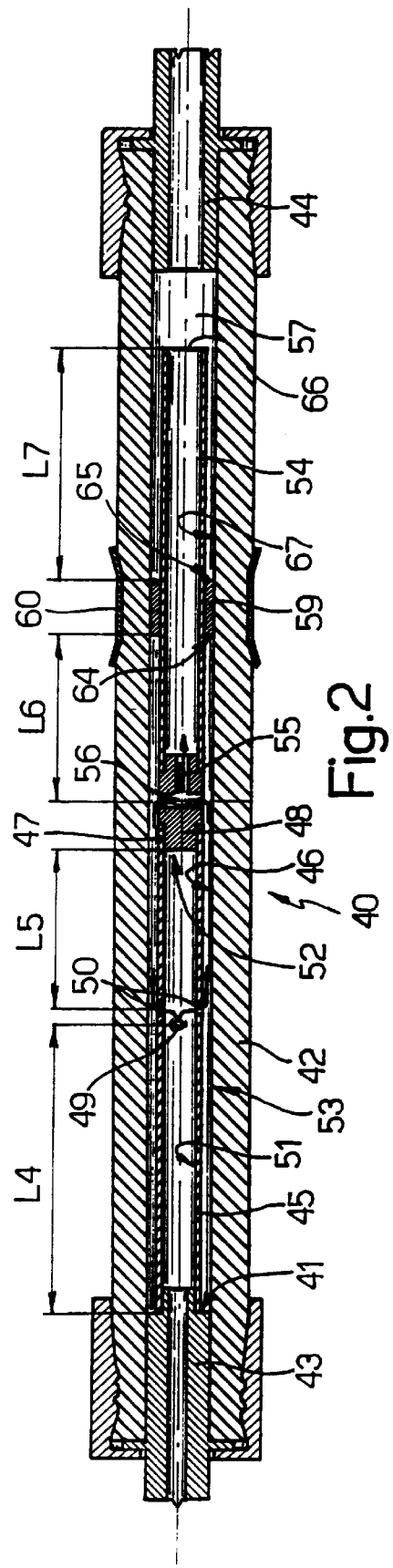

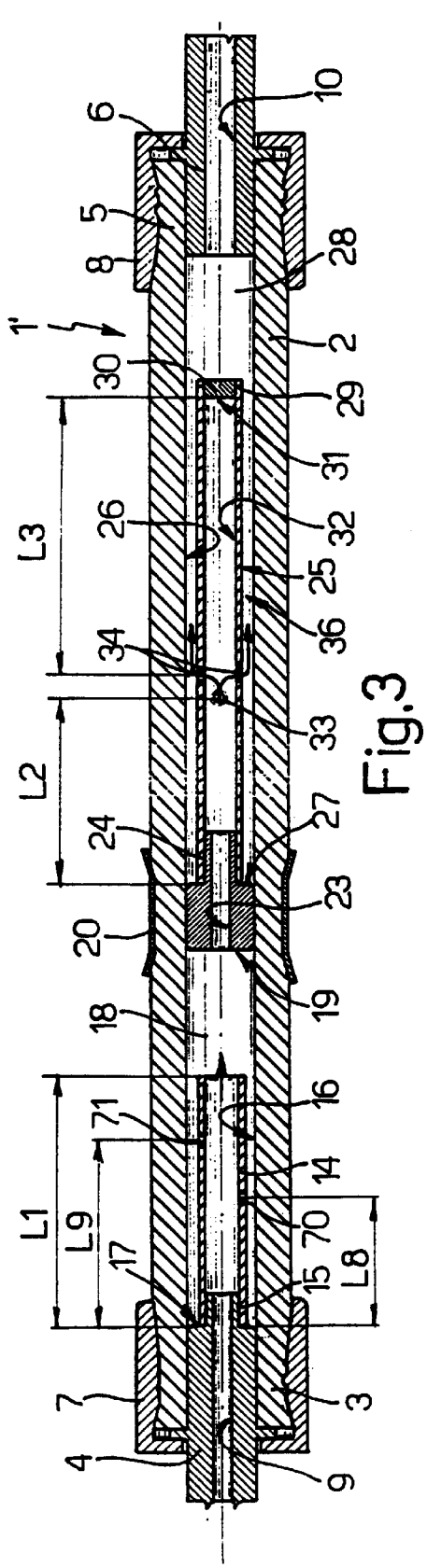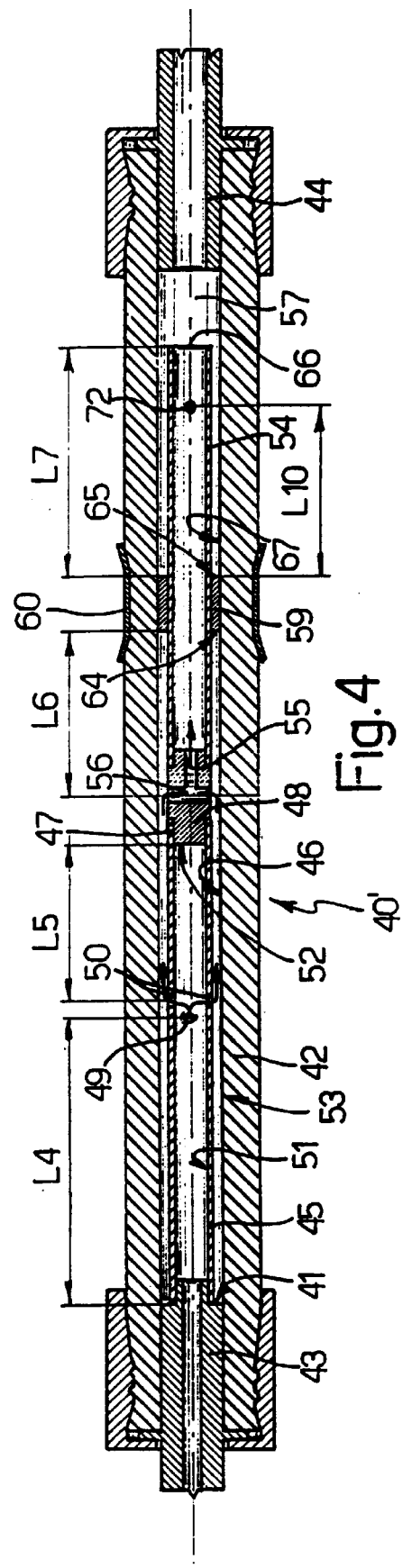

PRESSURE PULSE ATTENUATING FLUID SUPPLY CONDUIT

TECHNICAL FIELD

The present invention relates to a fluid supply conduit for attenuating the pressure pulses in the fluid, and particularly, though not exclusively, to a conduit for the hydraulic circuit of a vehicle power steering system.

BACKGROUND ART

As is known, in hydraulic systems in which the operating fluid is circulated by means of a pump, the pressure pulses generated by the pump are transmitted along the conduits and may give rise to undesired noise and vibration.

To reduce pulsation, conduits are currently used in which the path of the fluid is so devised as to produce reflected pressure waves which interfere with the incident waves; and by appropriately selecting the length of the wave paths, destructive interference of the waves is achieved to substantially eliminate pulsation at a given frequency.

In one known embodiment, the above conduits comprise an outer tube, and an inner tube extending a given length from an end fitting and defining an annular chamber with the outer tube. The fluid flows through the fitting into the inner tube, and, at the outlet of the inner tube, the incoming pressure waves interfere with the waves travelling along the annular chamber and reflected by the end wall of the chamber defined by the fitting. For interference to be destructive, the length of the annular chamber must be a quarter of the wavelength of the pressure waves.

With the above sizing of the inner tube, known conduits of the aforementioned type are "tuned" to a given frequency, whereas, in a real circuit, the pressure pulses are periodic but not purely sinusoidal with a well defined frequency, and may be divided into a number of frequency components comprising a fundamental or first harmonic component, and harmonic components of frequencies equal to multiples of the fundamental frequency. This therefore poses the problem of attenuating a number of components, typically the first two or three harmonics which present a much higher amplitude as compared with the harmonics of a higher order.

One way of doing this is to use a conduit comprising a number of elementary conduits of the above type in series with one another and each tuned to a respective frequency. Such a solution, however, results in an excessive total length of the conduit, and is therefore unsuitable for automotive applications in which size is a critical factor.

DISCLOSURE OF INVENTION

It is an object of the present invention to provide a compact fluid supply conduit for attenuating a number of frequency components of the pressure pulses in the fluid.

According to the present invention, there is provided a fluid supply conduit for attenuating the pressure pulses in the fluid, and comprising an outer tube; at least one inner tube housed inside, and forming an annular chamber with, said outer tube; and fitting means fitted in sealed manner to said outer tube and supporting the inlet end of said inner tube; said fitting means presenting at least one opening for feeding said fluid into said inner tube, and defining a first reflecting surface at one axial end of said annular chamber; characterized in that it comprises means for closing the opposite end of said inner tube, and defining a second reflecting surface; and in that said inner tube presents at least one intermediate hole at predetermined distances from said first and from said second reflecting surface.

BRIEF DESCRIPTION OF DRAWINGS

A number of preferred, non-limiting embodiments of the present invention will be described by way of example with reference to the accompanying drawings, in which:

FIG. 1 shows an axial section of a first conduit in accordance with the teachings of the present invention;

FIG. 2 shows an axial section of a second conduit in accordance with the teachings of the present invention;

FIG. 3 shows an axial section of a third conduit in accordance with the teachings of the present invention;

FIG. 4 shows an axial section of a fourth conduit in accordance with the teachings of the present invention.

BEST MODE FOR CARRYING OUT THE INVENTION

Number 1 in FIG. 1 indicates a high-pressure fluid supply conduit, particularly for the hydraulic circuit of a vehicle power steering system.

Conduit 1 comprises an outer tube 2 made of elastomeric material and presenting an end portion 3 fitted to an inlet fitting 4, and an opposite end portion 5 fitted to an outlet fitting 6. Portions 3, 5 are secured to respective fittings 4, 6 by respective known external bell type fasteners 7, 8 clamped on to portions 3, 5; and fittings 4, 6 present respective axial through holes respectively defining the inlet opening 9 and outlet opening 10 of conduit 1.

Conduit 1 also comprises a first inner tube 14 made of PTFE and secured to a hose fitting 15 defined by an axial appendix of inlet fitting 4, which first inner tube 14 defines with outer tube 2 an annular chamber 16 of length L1.

Annular chamber 16 is defined axially at one end by an annular surface 17 of inlet fitting 4, and terminates at the opposite end inside an expansion chamber 18 extending between first inner tube 14 and a fitting 19 fixed inside an intermediate portion of outer tube 2.

More specifically, fitting 19 is secured inside tube 2 by an outer sleeve 20 clamped on to tube 2, presents an axial hole 23, and is fitted with one end 24 of a second inner tube 25 also conveniently made of PTFE and extending towards outlet fitting 6. Second inner tube 25 defines with outer tube 2 a second annular chamber 26 defined axially by an annular surface 27 of fitting 19 and terminating at the opposite end in an expansion chamber 28 extending between second inner tube 25 and outlet fitting 6.

According to the present invention, the free end 29 of second inner tube 25 is closed by a plug 30 presenting a surface 31 axially defining a chamber 32 inside tube 25; and second inner tube 25 presents a number of holes 33, 34 connecting inner chamber 32 to second annular chamber 26 and at predetermined distances from surfaces 27 and 31.

More specifically, tube 25 presents a pair of first holes 33 diametrically opposite each other and at distance L2 from surface 27 of fitting 19; and a pair of second holes 34 downstream from first holes 33 and at distance L3 from surface 31 of plug 30. Outer tube 2 and second inner tube 25 together define an attenuating device 36 with two operating frequencies, as explained in more detail below.

Lengths L1, L2 and L3 are so determined as to equal a quarter of the wavelength of the frequency components of the pressure waves to be attenuated, and may be calculated theoretically on the basis of known formulas, and the theoretical result corrected experimentally to take into account real conditions.

Conduit 1 operates as follows.

The pressurized operating fluid flows through inlet fitting 4 into first inner tube 14 and out into expansion chamber 18 where the pressure pulses are attenuated by virtue of the elasticity of outer tube 2. On issuing from first inner tube 14, the pressure waves also travel along first annular chamber 16 and are reflected against surface 17 of the inlet fitting. Consequently, if length L1 equals a quarter of the wavelength of the frequency component to be attenuated, the reflected waves are push-pull added to the incident waves, thus attenuating the frequency component by destructive interference.

The fluid then flows through intermediate fitting 19 into second inner tube 25 and through holes 33, 34 into the second annular chamber 26, at which point the pressure pulses undergo a further two attenuations by destructive interference: a first by the pressure waves traveling along second annular chamber 26 being reflected against surface 27 of fitting 19; and a second by the waves inside chamber 32 being reflected against wall 31 of plug 30. In this case, too, the reflected and incident waves are push-pull added if lengths L2 and L3 equal a quarter of the wavelengths of the respective frequency components to be attenuated.

Finally, the fluid flows from second annular chamber 26 into second expansion chamber 28, where the pressure waves are further attenuated by virtue of the elasticity of outer tube 2, and then to outlet fitting 6.

FIG. 2 shows a conduit 40 according to a further embodiment of the present invention.

Like conduit 1, conduit 40 comprises an outer tube 42 made of elastomeric material and presenting inlet and outlet fittings 43, 44; and a first inner tube 45 fitted to fitting 43 and defining with outer tube 42 an annular chamber 46 defined axially at one end by an annular surface 41 of fitting 43.

According to the present invention, first inner tube 45 of conduit 40, conveniently made of PTFE, is closed by a fitting element 48 at end 47 opposite fitting 43, and presents a number of intermediate holes 49, 50 connecting the inner chamber 51 of tube 45 to annular chamber 46. More specifically, tube 45 presents a pair of first holes 49 diametrically opposite each other and at distance L4 from surface 41 of fitting 43; and a pair of second holes 50 downstream from first holes 49 and at distance L5 from end surface 52 of fitting element 48. Outer tube 42 and first inner tube 45 together define an attenuating device 53 with two operating frequencies, as explained in more detail below.

Fitting element 48 provides for both plugging first inner tube 45 and connecting a second inner tube 54 made of PTFE and extending towards outlet fitting 44, for which purpose, fitting element 48 presents a dead axial hole 55 communicating internally with tube 54, and a number of radial holes 56 connecting annular chamber 46 to hole 55.

At the opposite end, second inner tube 54 terminates inside an expansion chamber 57 communicating with outlet fitting 44, and an intermediate portion of second inner tube 54 is secured in sealed manner to outer tube 42 by an annular shutter 59 locked axially by an outer sleeve 60 force-fitted radially on to outer tube 42. Shutter 59 presents end surfaces 64, 65 located respectively at distance L6 from holes 56 and distance L7 from the outlet section 66 of second inner tube 54, and as such axially defines annular chamber 46 and separates it in sealed manner from a second annular chamber 67 between outer tube 42 and the end portion of second inner tube 54.

In this case, too, lengths L4, L5, L6 and L7 are so determined as to equal a quarter of the wavelength of the frequency components of the pressure waves to be attenuated.

Conduit 40 operates as follows.

The pressurized fluid flows through inlet fitting 43 into first inner tube 45 and through holes 49, 50 into annular chamber 46. As with tube 25 of conduit 1, the pressure pulses undergo two attenuations by destructive interference: a first by the pressure waves travelling along annular chamber 46 being reflected against surface 41 of fitting 43; and the second by the waves inside chamber 51 being reflected against wall 52 of plug 48.

Continuing along annular chamber 46, further attenuation by destructive interference is effected at holes 56 in fitting element 48, by the pressure waves in the final portion of annular chamber 46 being reflected against surface 64 of shutter 59.

The fluid then flows through holes 56, 55 in fitting element 48 into second inner tube 54, at the outlet of which, further attenuation by destructive interference is effected by the pressure waves being reflected against surface 65 of shutter 59; and at holes 56, a third attenuation of the pressure pulses by destructive interference is effected by the pressure waves in second annular chamber 67 being reflected against surface 65 of shutter 59.

Finally, the fluid flows into second expansion chamber 57 where the pressure waves are further attenuated by virtue of the elasticity of outer tube 42.

FIG. 3 shows a conduit 1' according to a variation of conduit 1 in FIG. 1, and which is therefore described solely insofar as it differs from conduit 1, and using the same reference numbers for any parts similar or corresponding to those already described.

Conduit 1' differs from conduit 1 by first inner tube 14 presenting two holes 70, 71 respectively located at distances L8 and L9 from surface 17 of inlet fitting 4. Distances L8, L9 correspond to a quarter of the wavelength of respective further frequency components to be attenuated, and attenuation is again effected by destructive interference of the incident waves and the waves travelling along annular chamber 16 and reflected by surface 17. Conduit 1' therefore provides for attenuating five frequency components of the pressure pulses in the incoming fluid, i.e. conveniently the fundamental and four orders of harmonics, to each of which corresponds one of lengths L1, L2, L3, L8 and L9.

Similarly, FIG. 4 shows a conduit 40' according to a variation of conduit 40 in FIG. 2, and which is therefore described solely insofar as it differs from conduit 40, and using the same reference numbers for any parts similar or corresponding to those already described.

Conduit 40' differs from conduit 40 by second inner tube 54 presenting a hole 72 communicating with second annular chamber 67 and at distance L10 from surface 65 of shutter 59. Distance L10 correspond to a quarter of the wavelength of a further frequency component to be attenuated, and attenuation is again effected by destructive interference of the incident waves and the waves travelling along annular chamber 67 and reflected by surface 65. Conduit 40' therefore provides for attenuating five frequency components of the pressure pulses in the incoming fluid, to each of which corresponds one of lengths L4, L5, L6, L7 and L10.

The advantages of conduits 1, 40, 1', 40' according to the present invention will be clear from the foregoing description.

In particular, using an inner tube (25 or 45) closed at one end and presenting one or more intermediate holes at appropriate given distances from reflecting surfaces defined by the inlet fitting of the tube and by the end plug provides for eliminating by destructive interference two different frequency components of the pressure waves using a single device with a highly axially compact structure.

Clearly, changes may be made to conduits 1, 40, 1', 40' as described and illustrated herein without, however, departing from the scope of the present invention.

In particular, the conduit may comprise one or more attenuating devices 36, 53 with two operating frequencies, combined with one another and/or with other interference, resonance or expansion attenuating devices; devices 36, 53 may comprise only one intermediate hole at given distances from respective reflecting surfaces; and inner tubes 14 and 54 of respective conduits 1' and 40' may present a different number of intermediate holes.

I claim:

1. A fluid supply conduit for attenuating pressure pulses in a fluid, said fluid supply conduit comprising:

an outer tube;

at least one inner tube disposed in said outer tube such that an annular chamber is formed therebetween;

fitting means fitted in a sealing manner to said outer tube and supporting an inlet end of said at least one inner tube, wherein said fitting means is provided with at least one opening for the introduction of said fluid into said at least one inner tube, and wherein said fitting means defines a first reflecting surface at an axial end of said annular chamber; and means for closing off an end of said at least one inner tube remote from said inlet end thereof, wherein said means defines a second reflecting surface, and wherein said at least one inner tube is provided with at least one intermediate hole at predetermined distances from said first and said second reflecting surfaces respectively.

2. A conduit as claimed in claim 1, wherein said at least one inner tube is provided with at least one first hole at a first given distance from said first reflecting surface, and at least one second hole at a given distance from said second reflecting surfaces.

3. A conduit as claimed in claim 1, wherein said at least one inner tube is made of PTFE.

4. A conduit as claimed in claim 1, wherein said fitting means comprises a fitting element fixed inside an intermediate portion of said outer tube.

5. A conduit as claimed in claim 4, wherein said fitting element is secured by a sleeve clamped onto said outer tube.

6. A conduit as claimed in claim 4, wherein a further inner tube is connected to an inlet fitting that is fitted to said outer tube.

7. A conduit as claimed in claim 6, wherein said further inner tube is made of PTFE.

8. A conduit as claimed in claim 6, wherein said further inner tube is provided with at least one intermediate hole.

9. A conduit as claimed in claim 1, wherein said fitting means comprises an inlet fitting to which said outer tube is fitted.

10. A conduit as claimed in claim 9, wherein said closing means comprises a fitting element, and a second inner tube is connected to said fitting element.

11. A conduit as claimed in claim 10, wherein said fitting element is provided with at least one passage connecting said annular chamber to said second inner tube.

12. A conduit as claimed in claim 11, wherein an annular element is interposed between said outer tube and said second inner tube, said annular element defining a third reflecting surface axially defining said annular chamber and a fourth reflecting surface defining a second annular chamber between said outer tube and an end portion of said second inner tube remote from said fitting element.

13. A conduit as claimed in claim 12, wherein said annular element is secured by a sleeve clamped onto said outer tube.

14. A conduit as claimed in claim 10, wherein said second inner tube is made of PTFE.

* * * * *